United States Patent [19]
Bolsworth et al.

[11] Patent Number: 5,393,116
[45] Date of Patent: Feb. 28, 1995

[54] VAN-TYPE VEHICLE MULTI-POSITIONAL SEAT

[75] Inventors: James Bolsworth; Kenneth S. Pyszel, both of Sterling Heights; Joseph D. Kondziola, Troy; Terrel L. Scherman, Rochester Hills; Wilheim R. Braner, East Lansing, all of Mich.

[73] Assignee: General Motors Corporation, Detroit, Mich.

[21] Appl. No.: 214,505

[22] Filed: Mar. 17, 1994

Related U.S. Application Data

[63] Continuation of Ser. No. 140,940, Oct. 25, 1993, abandoned.

[51] Int. Cl.$^6$ .............................................. B60N 2/04
[52] U.S. Cl. ..................... 296/65.1; 296/69; 297/367; 297/378.12
[58] Field of Search ................. 296/65.1, 69; 297/367, 297/378.12

[56] References Cited

U.S. PATENT DOCUMENTS

| | | | |
|---|---|---|---|
| 3,880,464 | 4/1975 | Murphy et al. | 297/326 |
| 4,484,776 | 11/1984 | Gokimoto et al. | 296/65.1 |
| 4,627,656 | 12/1986 | Gokimoto et al. | 296/65.1 |
| 4,700,989 | 10/1987 | Ercilla | 297/331 |
| 4,925,229 | 5/1990 | Siebler | 296/65.1 |

*Primary Examiner*—Dennis H. Pedder
*Attorney, Agent, or Firm*—Ernest E. Helms

[57] ABSTRACT

A releasably mounted seat for a van-type vehicle is provided which in an embodiment includes a rear leg biased to latch to a floor of a vehicle, a seat bun frame joined to the rear leg providing a seating surface, a backing plate pivotally mounted with respect to the bun frame and selectively adjustable with respect to the bun frame means, a seat back pivotally mounted with respect to the backing frame and foldable between a first position generally extending with the backing plate and a second position folded forward generally adjacent the bun frame, and a single handle providing control to selectively position the seat back in the first and second positions and the handle providing control to selectively adjust the position of the backing plate with respect to the bun frame, and the handle providing control over the engagement of the latch of the rear leg with the vehicle floor.

5 Claims, 5 Drawing Sheets

VAN-TYPE VEHICLE MULTI-POSITIONAL SEAT

This is a continuation of U.S. Ser. No. 08/140,940, filed Oct. 25, 1993, now abandoned.

FIELD OF THE INVENTION

The field of the present invention is that of removable-type seating for van-type vehicles and methods of utilization thereof. More particularly, the field of the present invention is for van-type seats which are adjustably reclining and which also have a fold-down position to accommodate storage or to provide a table surface for the remainder of the seating occupants.

BACKGROUND OF THE INVENTION

In van-type vehicles, especially minivans, it is known to have seating which is removable from the van to increase the cargo capacity thereof. Additionally, it is also known to have removable seats which have a fold-down position which accommodate storage or provide a table surface for the other van occupants. Most of such removable-type van-type seating which has a fold-over position has one latch to allow the seat back to be folded down adjacent a seat bun and another latch or release mechanism allowing the rear legs of the vehicle seat to be released from the vehicle floor. Most of the above-noted seats are not adjustable in the reclining mode; that is, they do not have a reclining seat back. When such seats do have a reclining mode, it requires another handle or lever independent of the handle or lever which allows the seat back to be placed in a folded-down position independent of the handle or lever which allows the rear legs of the seat to be released from the vehicle floor.

SUMMARY OF THE INVENTION

The present invention brings forth a removable van-type vehicle seat which is adjustable in the reclining position, has an alternate fold-down position placing the seat back adjacent the seat bun, and has a release mechanism for releasing the rear legs from the vehicle floor, wherein all of the above-noted functions are accomplished by operation of a single handle or lever. In a preferred embodiment of the present invention, the releasing of the rear legs from the vehicle floor cannot be accomplished unless the seat back has been folded down to its fold-down position.

DETAILED DESCRIPTION OF THE PREFERRED EMBODIMENTS

Figure 1:
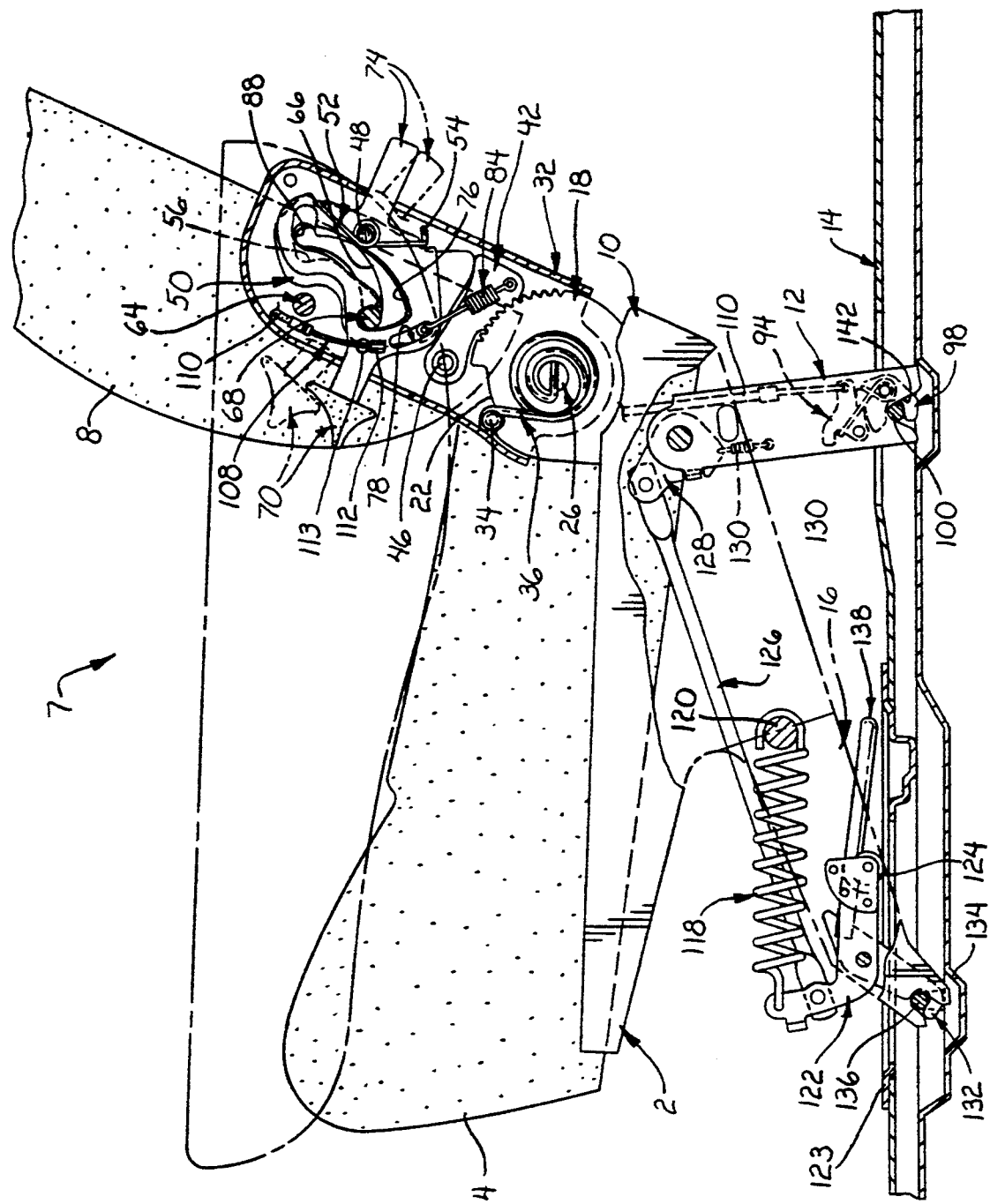
FIG. 1 is a side elevational view, partially in section, of a preferred embodiment seat according to the present invention attached to the vehicle floor.

Referring to FIGS. 1 through 5, the preferred embodiment vehicle seat 7 according to the present invention has a seat bun frame 2 covered by a seat cushion 4. Pivotally mounted with respect to the seat bun frame 2 is a backing plate 32. Adjustably pivotably mounted with respect to the backing plate 32 is a seat back 8. Supporting a rearward end 10 of the seat bun frame and mounting the same to the vehicle floor 14 is a pair of rear legs (only one shown) 12. The vehicle seat 7 is releasably mounted to the floor 14 also by a pair of front legs (only one shown) 16.

Figure 2:
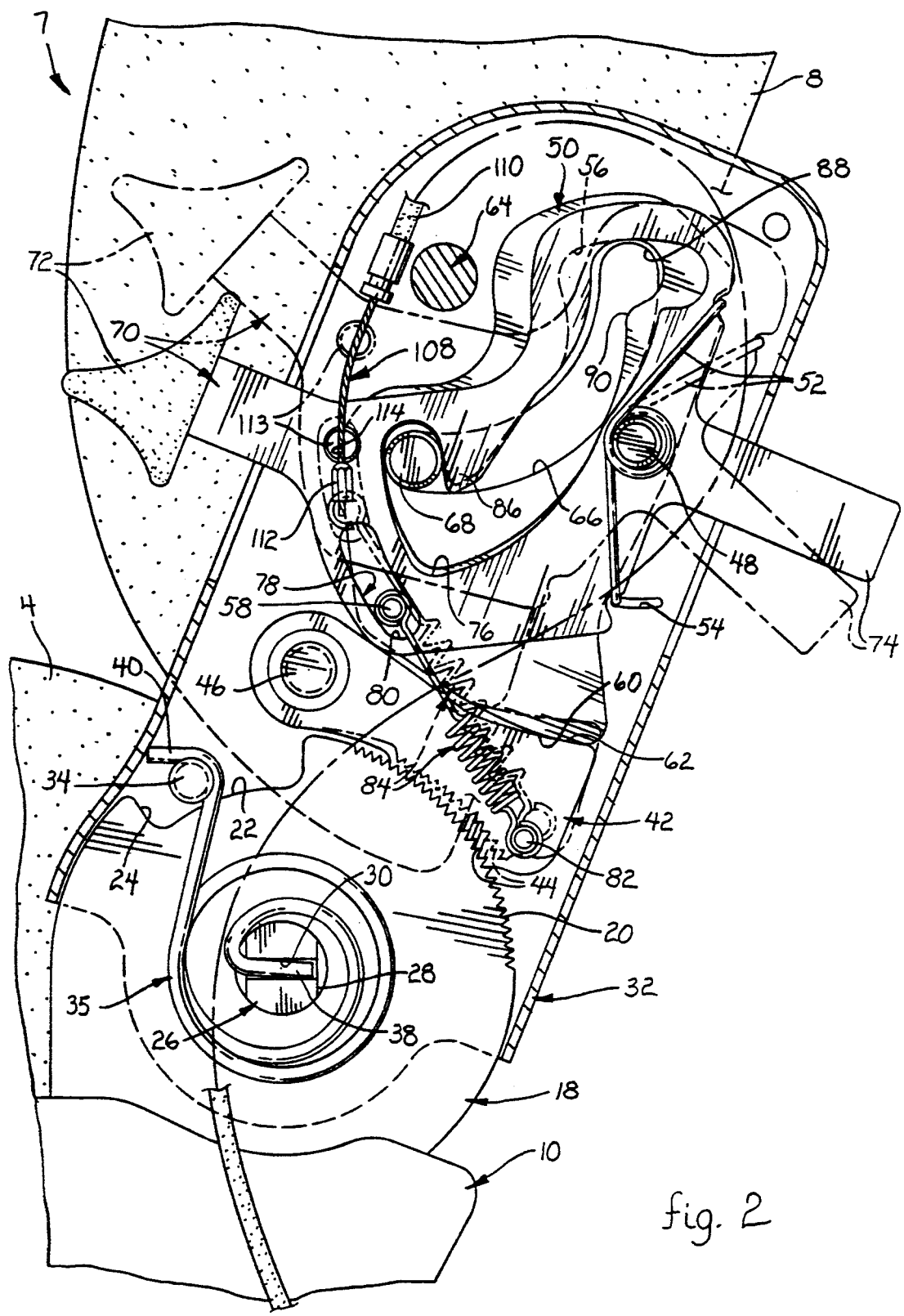
FIG. 2 is an enlargement of a portion of FIG. 1 showing operation of the release handle in greater detail.

Referring in more detail to FIG. 2, the rear end 10 of the bun frame has fixably connected to it a sector gear 18 with teeth 20. The sector gear 18 also has a flat 22 bordered by a stop surface 24. Fixably connected with the sector gear 18 is a projecting pin or cross bar 26 having milled ends 28. The cross bar 26 also has a through bore 30.

Pivotally mounted on the cross bar 26 is the backing plate 32. The backing plate 32 has connected thereto a stud pin 34. A coil torsion spring 36 having one end 38 inserted within the bore 30 of the cross bar 26 and another end 40 wrapped the backing plate stud pin 34 biases the backing plate 32 forwardly until the stud pin 34 hits the stopping surface 24 of the sector gear, thereby biasing the backing plate in its full upright position. The backing plate 32 has a generally arcuate slot 66.

Above the sector gear 18 is a pawl 42. Pawl 42 has teeth 44 for selective engagement with the teeth 20 of the sector gear. The pawl 42 is pivotally connected with the backing plate by a pin 46.

Pivotally mounted to the backing plate 32 by a pin 48 is a cam plate 50. The cam plate 50 is biased to rotated in a counterclockwise manner by a torsion spring 52 which is also wrapped around pin 48 and which is connected with the backing plate 32 via a slot 54. The cam plate 50 has a generally interior S-shaped slot 56 and a fixed pin 58 which projects generally perpendicular from the plane of the cam plate 50. Additionally, the major dimension of the cam plate 50 lies in the same plane as the pawl 42. The cam plate 50 has a lower camming surface for contact with a corresponding camming surface 62 of the pawl 42.

The seat back 8 is pivotally mounted to the backing plate 32 by a pin 64. Additionally, the seat back 8 has a projecting pin 68 which is captured in the arcuate slot 66 provided in the backing plate and within the S-shaped slot 56 of the cam plate.

Above the cam plate 50 is a release handle lever 70. The release handle 70 is also pivotally mounted to the backing plate by pin 48 and is additionally spring biased in the counterclockwise direction by the torsion spring 52. The release handle 70 can be reached along its forward end by tip 72 or at its rearward end by stud extension 74.

The sector gear 18, pawl 42, cam plate 50 and torsion spring 52 form a first adjuster mechanism to selectively adjust the position of the backing plate 32 with respect to the bun frame 2.

The handle 70 has an S-shaped interior slot 76 similar to the interior slot 56 of the cam plate 50 and has a smaller oblong slot 78 which captures the cam plate pin 58. When the seat back 8 is in its upright first position generally aligned and extending with the backing plate 32, the handle 70 cannot be pushed downwardly on its tip 72 due to interference of the seat back extending pin 68. The handle has fixably connected thereto a post 113 which extends from a side of the handle 70 opposite the cam plate 50.

To recline seat back 8, tip 72 of the handle 70 is pulled upwardly. The upward pull on handle 70 causes a bottom 80 of the slot 78 to pull upon the cam plate pin 58. The pull of the cam plate 58 additionally causes a pull upon an extension spring 84 which is connected with the pin 58 of the cam plate and a pin 82 of the pawl. The above-noted pull on release handle 70 causes the cam plate 50 to rotate in a counterclockwise direction, pulling the pin 82 of the pawl in a clockwise direction, thereby removing the engagement of the teeth 44 of the pawl with the teeth 20 of the sector gear. At that moment, the seat vehicle operator can lean back and, against the biasing force provided by the spring 36, recline to the newly-desired seat back reclining position. Upon the desired reclining seat back position being obtained, the extension spring 84 in combination with the torsion spring 52 will cause the cam plate to again rotate in a counterclockwise position. Extension spring 84 will cause the cam plate camming surface 60 to move rightwardly with respect to the cam surface 62 of the pawl, thereby causing the pawl to have a generally clockwise rotation about pin 46, reengaging the pawl teeth 44 with the gear teeth 20 of the sector to again determine the fixed position of the backing plate 32 with respect to the seat bun frame rear end 10 and accordingly set the new reclining position of the seat back 8. After the release of the handle 70 by the vehicle operator, the torsion spring 52 will cause the release lever 70 to assume its normal position, and the adjusted reclining position of the seat back 8 is finally set.

Figure 3:
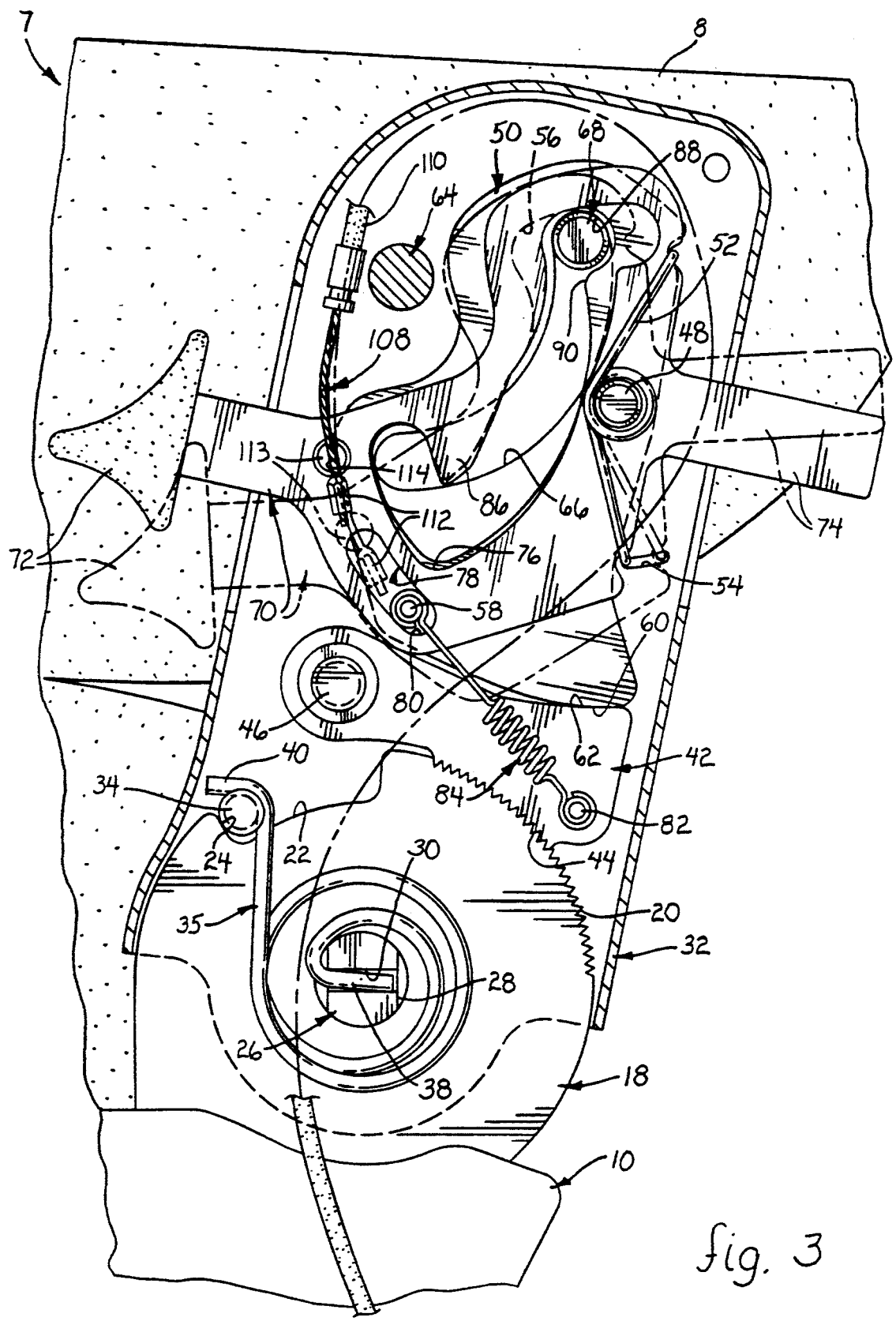
FIG. 3 is a view similar to that of FIG. 2 but illustrating placement of the seat back in the folded-down position.

Referring additionally to FIG. 3, the detent sections 86, cam plate 50 and slot 56 cooperate to form a second adjuster mechanism to provide for the seat back 8 to be folded with respect to the backing plate 32. To allow the seat back 8 to be independently folded forwardly to its second position angled with the backing plate 32 and generally adjacent to the seat bun 4, the handle 70 independently is pulled an additional amount upwardly (from that required to adjust the seat back 8). This additional pull removes the detent sections 86 of the handle 70 and the cam plate 50 to be removed from the slot 66 in the backing plate 32. Upon the above removal, the seat back 8 is free to pivot about its pin 64, and the pin 68 is free to travel to an upper extreme position 88 of the slot 66 provided in the backing plate 32. It should be noted that at this time, the spring 36 will automatically cause the backing plate 32 to come to its most upright position by contact of the pin 34 with the stop 24. Upon the seat back 8 being pivoted to its forward position as shown in FIG. 3, release of the handle 70 will allow the cam plate 50 to rotate again in a counterclockwise direction, allowing the S-shaped slot detent section 90 of the cam plate 50 to lock the pin 68 in its uppermost position, thereby preventing the seat back 8 from being raised to an upright position without the utilization of the release handle 70.

Figure 4:
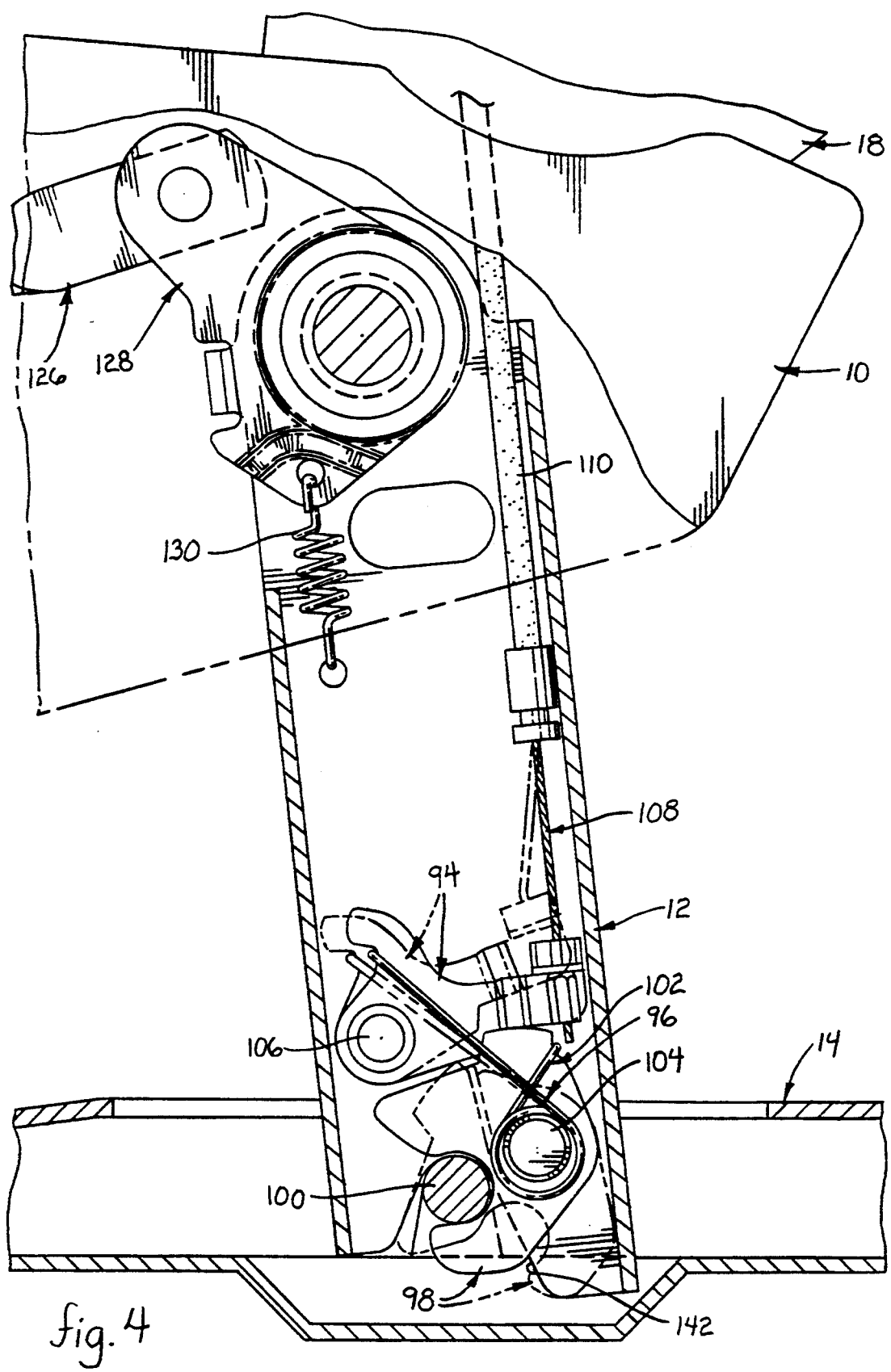
FIG. 4 is an enlargement of FIG. 1 and the rear leg area of the seat for illustrating the operation of the release mechanism in regard to the releasing of the rear legs of the seat from the vehicle floor.

Referring additionally to FIG. 4, the latching mechanism 92 of the rear leg 12 includes a detent lever 94 biased by a torsion spring 96 to engage with a fork bolt 98. The fork bolt grabs a striker 100 fixably connected to the vehicle floor 14. A pivot pin 104 mounts the torsion spring 96. The torsion spring 96 has one end 102 biasing the fork bolt 98 to rotate in a counterclockwise manner about its pivot pin 104. In an opposite manner, torsion spring 96 pivots the detent lever in a clockwise rotation about a pin 106. To release the rear leg 12 from the striker 100, a pull must be made upon a cable 108 connected with the detent lever 19. That pull must move the detent lever 94 to the position shown in phantom, thereby allowing the fork bolt 18 to rotate to its phantom position to release from the striker 100.

To allow for a pull upon the cable 108, the end of the cable 108 opposite the detent lever 94 has a bullet 112 connected thereto. The bullet 112 is of such a size that it cannot extend through a slot 114 which extends through the post 113 and which also captures the cable 108. To allow the rear leg to be released, the handle 70 is pulled downwardly, pulling the cable 108 through its guide 110 and thereby pulling the detent lever 94 in a counterclockwise manner, effecting release of the fork bolt 98. As can be seen from a comparison of FIG. 2 and FIG. 3, as mentioned previously, the handle 70 (tip 72) cannot be pulled downwardly unless the pin 68 is at the upper position 88 of the slot 66 provided in the backing plate 32. Therefore, the seat back 8 must be folded forwardly before the legs 12 can be released. Although not shown, it is obvious to those familiar with the art that the cable 108 will have a like cable for the other leg 12 if it is desired for both legs to latch to strikers 100 in the vehicle floor.

Figure 5:
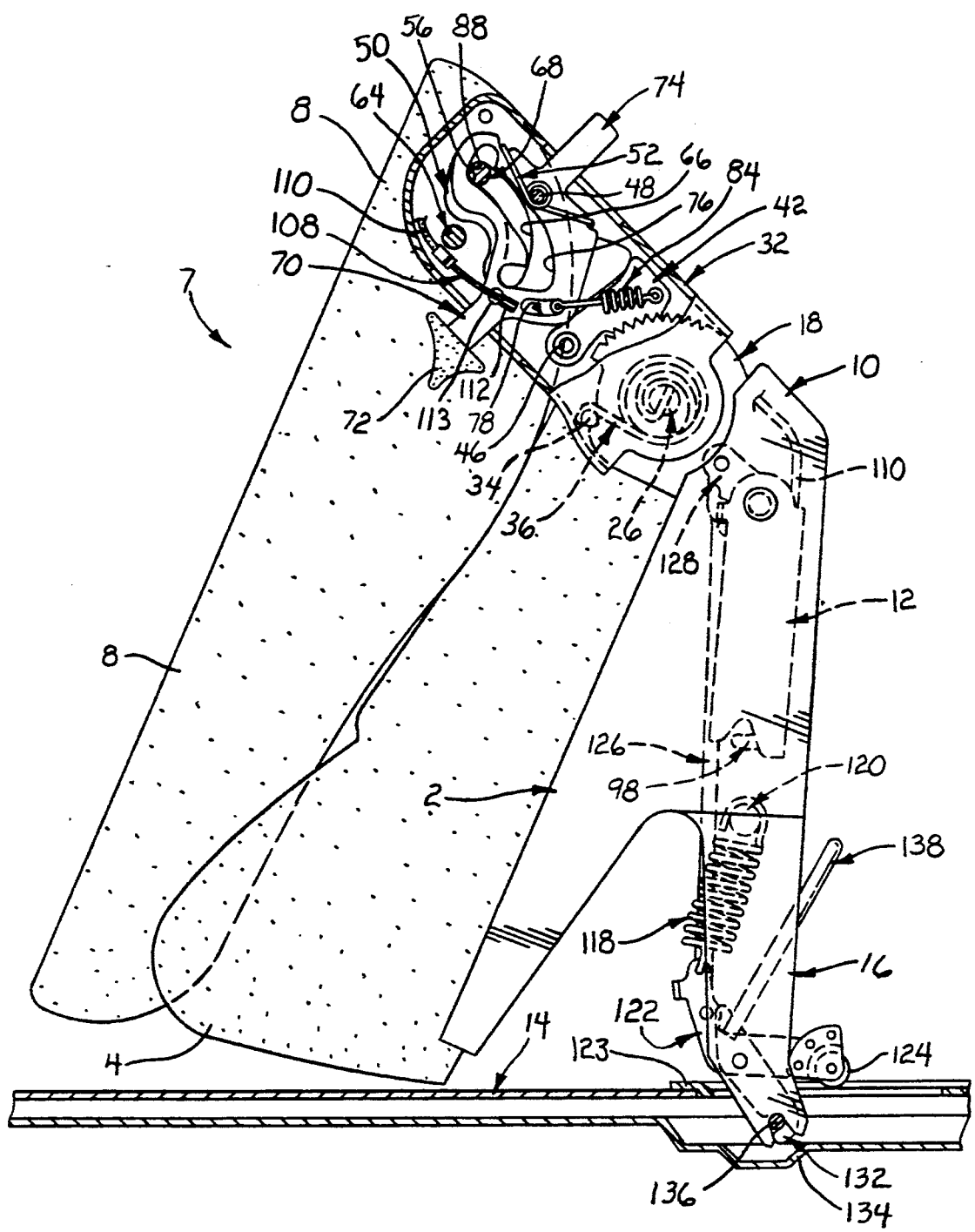
FIG. 5 illustrates the seat in a pivoted forward position.

With the rear leg assemblies released, the seat 7 is now free to rotate up to a storage "flip" position as an extension spring 118 is connected to a pedestal pin 120 at one end and applies a force to the cam assembly 122 to drive a cam 124 down against the floor escutcheon 123 which raises the seat 7 to an upright storage "flip" position (see FIG. 5). As the seat 7 rotates to the storage "flip" position, a connecting rod 126 pushes on a bracket 128 which in turn rotates the rear legs 12 via a return spring 130 to a retracted position to prevent accidental contact with the occupant during normal use, such as entry or exit from the vehicle.

Once the seat 7 is in the storage "flip" position and a front fork bolt 132 is clear of the safety blockout ramp 134 (incorporated into the floor escutcheon and/or cup), the front fork bolt 132 is free to travel away from the floor pan front striker 136 by pulling on a front leg release handle 138. Once clear of the floor pan striker 136, the seat 7 can be easily lifted and removed.

To install the seat 7 into the vehicle, the front legs 140 of the seat 7 are placed over the front floor strikers 136, the fork bolts 132 are pushed down onto the striker 136, the seat 7 is then rotated rearwardly and the cam 124 contacts the floor escutcheon 123, which then pulls the connecting rod 126 which in turn pulls the bracket 128 and rotates the rear leg 12 out to a ready position to engage the rear floor pan striker 100. As the rear leg 12 comes in contact with the striker 100, a surface 142 (shown in FIG. 4) will drive the leg 12 rearward and will pull on the extension spring 130 which is connected to the bracket 128. The rear striker 100 then pushes the rear fork bolt 98 against the detent lever 94 to its latched position.

It is apparent to those skilled in the art that the handle 70, cam plate 50, pawl 42 and sector gear teeth 20 will not be required on both sides of the seat if so desired.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A releasably mounted seat for a vehicle comprising:
    at least one leg latched to a floor of a vehicle, the leg having a latch mechanism biased for engagement with the vehicle floor;
    a seat bun frame joined to the leg providing a contact seating surface;
    a backing plate pivotally mounted with respect to the bun frame;
    a first adjuster mechanism to selectively adjust the position of the backing plate with respect to the bun frame;
    a seat back pivotally mounted with respect to the backing frame;
    a second adjuster mechanism to selectively position the seat back in a first position generally aligned and extending with the backing plate and a second position wherein the seat back is angled with respect to the backing plate and is folded forward generally adjacent the bun frame; and
    a single handle providing control over the first adjuster mechanism to selectively adjust the position of the backing plate with respect to the bun frame and independent control over the second adjuster mechanism to selectively position the seat back in the first and second positions with respect to the backing plate, and the handle providing independent control over the engagement of the latch mechanism of the leg with the vehicle floor.

2. A vehicle seat as described in claim 1 wherein the leg latch mechanism cannot release from the vehicle floor until the seat back is folded forwardly in the second position.

3. A vehicle seat as described in claim 1 wherein the handle is pulled in a first direction a first amount to selectively adjust the position of the backing plate with respect to the bun frame and a second additional amount in the first direction to position the seat back from the first position to the second position and wherein the handle is moved in a second direction opposite the first direction to release the leg latch mechanism from the vehicle floor.

4. A vehicle seat as described in claim 3 wherein the first direction is generally upwardly and the second direction is generally downwardly.

5. A method of providing a releasably mounted seat for a vehicle comprising:
    attaching a latch to a seat leg;
    biasing the latch of the leg for engagement with a floor of the vehicle;
    joining to the seat leg a seat bun frame providing a seating surface;
    pivotally mounting with respect to the seat bun frame a backing plate;
    selectively adjusting the position of the backing plate with respect to the bun frame by moving a handle in a first direction;
    pivotally mounting with respect to the backing plate a seat back;
    selectively positioning the seat back in a first position extending generally aligned with the backing plate to a second position angled with the backing plate and folded forwardly generally adjacent the bun frame by moving the handle a second additional amount in the first direction; and
    releasing the latch of the leg from the vehicle floor by moving the handle in a second direction opposite the first direction.

* * * * *